INVENTORS
Joseph F. Louvar
Newlin S. Nichols
BY
ATTORNEY

United States Patent Office

3,582,491
Patented June 1, 1971

3,582,491
REMOVAL OF INORGANIC CATALYSTS FROM POLYOLS
Joseph F. Louvar, Lincoln Park, and Newlin S. Nichols, Dearborn, Mich., assignors to Wyandotte Chemicals Corporation, Wyandotte, Mich.
Filed June 12, 1969, Ser. No. 832,700
Int. Cl. B03c 5/00
U.S. Cl. 204—186   5 Claims

ABSTRACT OF THE DISCLOSURE

A method for removing water-soluble impurities from water-insoluble polyethers which comprises providing a mixture of water, polyether, and a solvent which is substantially immiscible in water, which has a density substantially different from water in which the polyether is soluble and which is relatively inert with respect to the polyether and water, whereby a polyether-solvent solution is formed which is substantially immiscible in water. The solvent is employed in an amount sufficient to adjust the density differential between the polyether-solvent solution and water to at least about 0.03 gram per milliliter. The polyether-solvent solution is then separated from the water by electrostatic coalescence. A stream of water containing dissolved therein the water-soluble impurities and a stream of polyether-solvent solution are separately recovered after the precipitation, followed by separating the solvent from the polyether-solvent solution.

---

Figure 1:
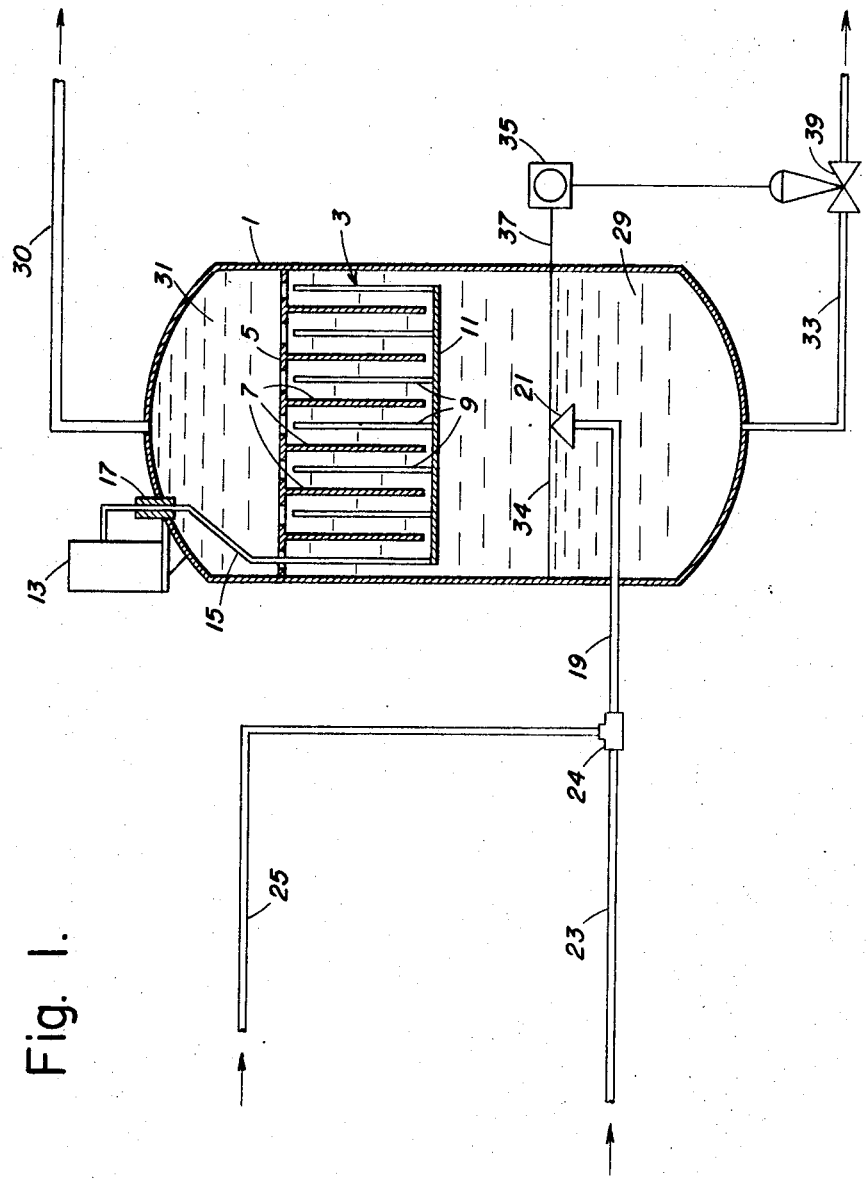

Essentially water-insoluble hydroxyl-containing polyethers, hereafter, for convenience, called polyethers, are commonly used for the production of urethane polymers. The said polyethers are reacted with polyisocyanates, in the presence of added catalysts and other materials, to produce the urethane polymers which may be in the form of rubber-like elastomers, foams of flexible or rigid character, and the like. In order that urethane polymers of desired properties and characteristics be produced, it is important that the polyethers to be reacted with the polyisocyanates be essentially free of impurities which may function as undesirable catalysts or otherwise undesirably in the urethane polymer reaction.

Polyethers as commercially prepared, in crude form, contain, for instance, various water-soluble impurities such as alkali metal hydroxides or other metal salts, or if acid catalysts are used, acidic materials. In general, present commercial practices for the removal of water-soluble impurities, generally speaking, involved treating the crude polyether with adsorbents, commonly clay-type absorbents, followed by filtration. Such known treatments, while reasonably effective for the removal of undesirable water-soluble impurities from the polyethers, have serious disadvantages because of economic considerations since they result in undue losses of the polyethers and they entail the costs for the adsorbent, the filtration operation, and adsorbent revivification if efforts are made to reuse the adsorbent after it has become spent. Ordinary water washing of the crude polyethers has not proved feasible because of the very small differences of the specific gravities of the polyethers and wash water.

Accordingly, it is a purpose of the instant invention to remove the water-soluble impurities, primarily catalyst, from water-insoluble polyethers by a simple, efficient, and effective process.

This and other purposes of the instant invention are accomplished by providing a mixture of water, polyether, and a solvent which is substantially immiscible in water, which has a density substantially different from water in which the polyether is soluble and which is relatively inert with respect to the polyether and water, whereby a polyether-solvent solution is formed which is substantially immiscible in water. The solvent is employed in an amount sufficient to adjust the density differential between the polyether-solvent solution and water to at least about 0.03 gram per milliliter. The polyether-solvent solution is then separated from the water by electrostatic coalescence wherein the polyether-solvent solution is subjected to an electrostatic field which expedites coalescence of small droplets to form larger drops. A stream of water containing dissolved therein all of the water-soluble impurities and a stream of polyether-solvent solution are then separately recovered, followed by separating the solvent from the polyether-solvent solution by suitable means such as stripping. After separating the solvent from the polyether-solvent solution the solvent may be recycled.

In general, the impurities present in the polyether polyols which must be removed are catalysts used in the preparation of the polyether polyol. These catalysts are generally alkali metal hydroxides and alkali metal alkoxides, such as sodium hydroxide, potassium hydroxide, sodium alkoxide, potassium alkoxide, etc. Additional catalysts which may be employed in the preparation of such polyethers and which may be removed by the instant process include quaternary ammonium bases and the hydroxides and alkoxides of lithium, rubidium and cesium as well as well-known acid catalysts.

Generally speaking, the polyethers, purified in accordance with the present invention, are those which are characterized as being essentially hydroxyl-terminated polyether polyols and they include the polyoxyalkylene ether glycols which have the general formula $H(OR)_nOH$ where R is an alkylene radical and $n$ is an integer which in a preferred embodiment is sufficiently large that the compound as a whole has a molecular weight of about 300 to 10,000. The polyethers include, for example, the oxyalkylene adducts of polyol bases wherein the oxyalkylene portion is derived from monomeric units such as ethylene oxide, propylene oxide, butylene oxide and mixtures thereof. The polyol bases include 1,2-propylene glycol, 1,3-propylene glycol, 1,2-butanediol, 1,4-butanediol, hexanetriol, glycerol, trimethylolpropane, hydroquinone, bisphenol A, pentaerythritol, alpha-methyl glucoside, sorbitol and sucrose; polyethers such as polyethylene ether glycols, polypropylene ether glycols, polytetramethylene ether glycols, and alkylene oxide adducts of polyhydric alcohols including those listed above.

Typical polyether polyols include polyoxypropylene glycol, polyoxybutylene glycol, polytetramethylene glycol, block copolymers, e.g., combinations of polyoxypropylene and polyoxyethylene glycols, more specifically, those having the general formula:

$$HO(C_2H_4O)_n(C_3H_6O)_m(C_2H_4O)_nH$$

wherein $n$ and $m$ are together sufficient for attainment of the desired molecular weight, i.e., about 300 to 10,000. Also included are copolymers of poly-1,2-oxybutylene and polyoxyethylene glycols; and poly-1,4-oxybutylene and polyoxyethylene glycols; and random copolymer glycols prepared from blends, or sequential addition, of two or more alkylene oxides as well as glycols, as described above, capped with ethylene oxide units. The polyethers, purified in accordance with this invention, can contain arylene or cycloalkylene radicals together with the alkylene radicals as, for example, in the condensation product of a polyoxyalkylene ether glycol with a,a'-dibromo-p-xylene in the presence of alkali. In such products, the cyclic groups inserted in the polyether chain are preferably phenylene, naphthalene or cyclohexylene radicals or these radicals containing alkyl or alkylene substituents, as in the tolylene, phenylethylene or xylylene radicals.

Any solvent which is relatively inert with respect to water, catalyst and the polyether which is substantially immiscible in water, which has a density substantially different from water and in which the polyether is soluble may be employed as the solvent. A preferred solvent is hexane. Other solvents which may be employed include the butanes, pentanes, heptanes, octanes, nonanes, decanes, halogenated organics such as carbon tetrachloride, methylchloroform, dichlorodifluoromethane, 1,1,2 - trichloro - 1,2,2 - trifluoroethane, perchloroethylene, fluoro, chloro, bromo, and iodo benzenes and toluenes; ethyl, propyl, butyl, amyl, hexyl, and benzyl halides, particularly the chlorides, bromides, and iodides.

The amount of solvent employed should be sufficient to provide a solution of solvent and polyether which solution has a density differential with respect to water of at least about 0.03 gram per milliliter and preferably at least about 0.1 gram per milliliter. Substantially greater amounts may be employed but larger amounts merely require the use of more solvent which must be subsequently removed and, generally, the less solvent employed the better as long as a sufficient amount is present to obtain the desired density differential.

In the practice of the invention, the polyether may be first mixed with the water after which the solvent is added, or the polyether can be first mixed with solvent and then water, or all three components could be mixed together simultaneously. The water is added generally in an amount ranging from about 0.1 to 4 parts of water per part of polyether by volume. The mixture of water, solvent, and polyether is preferably at a temperature of about 60 to 120° C. before entering the electrostatic coalescer.

The separation step can be carried out with various types of commercial electrostatic coalescers, also called electric precipitators. Simply stated, an electric precipitator or coalescing unit consists of a vessel containing two or more electrodes—one grounded to the vessel and the other suspended by insulators, plus an electrical system through which an electric potential is applied to the suspended electrodes. Numerous arrangements and configurations of electrodes have been employed in such devices and design parameters for such devices may be easily determined by one skilled in the art. Arrangement and spacing of electrodes depends on characteristics of the substances to be processed and process conditions. Intensity of the electrostatic field is controlled by spacing of electrodes and applied voltage. Feed rate is a major controlling factor in sizing vessels for coalescing units. Vessels are generally sized for a certain volume flow per unit time per square foot of cross-sectional area at the center line. Design rate of flow varies considerably for different applications. However, there is no decided disadvantage for oversizing from the standpoint of coalescing but there is a debit in the additional cost. The time in the electrostatic field is controlled by the electrode spacing and configuration. An example of a suitable commercial electric precipitator is one marketed by the Petrolite Corporation, Petreco Division of Houston, Tex., under the name Electrofining Metercell Precipitator referred to on page 3 of the booklet entitled "Petreco Distillate Treating" No. 6516–AC–5–M–1265.

Figure 2:
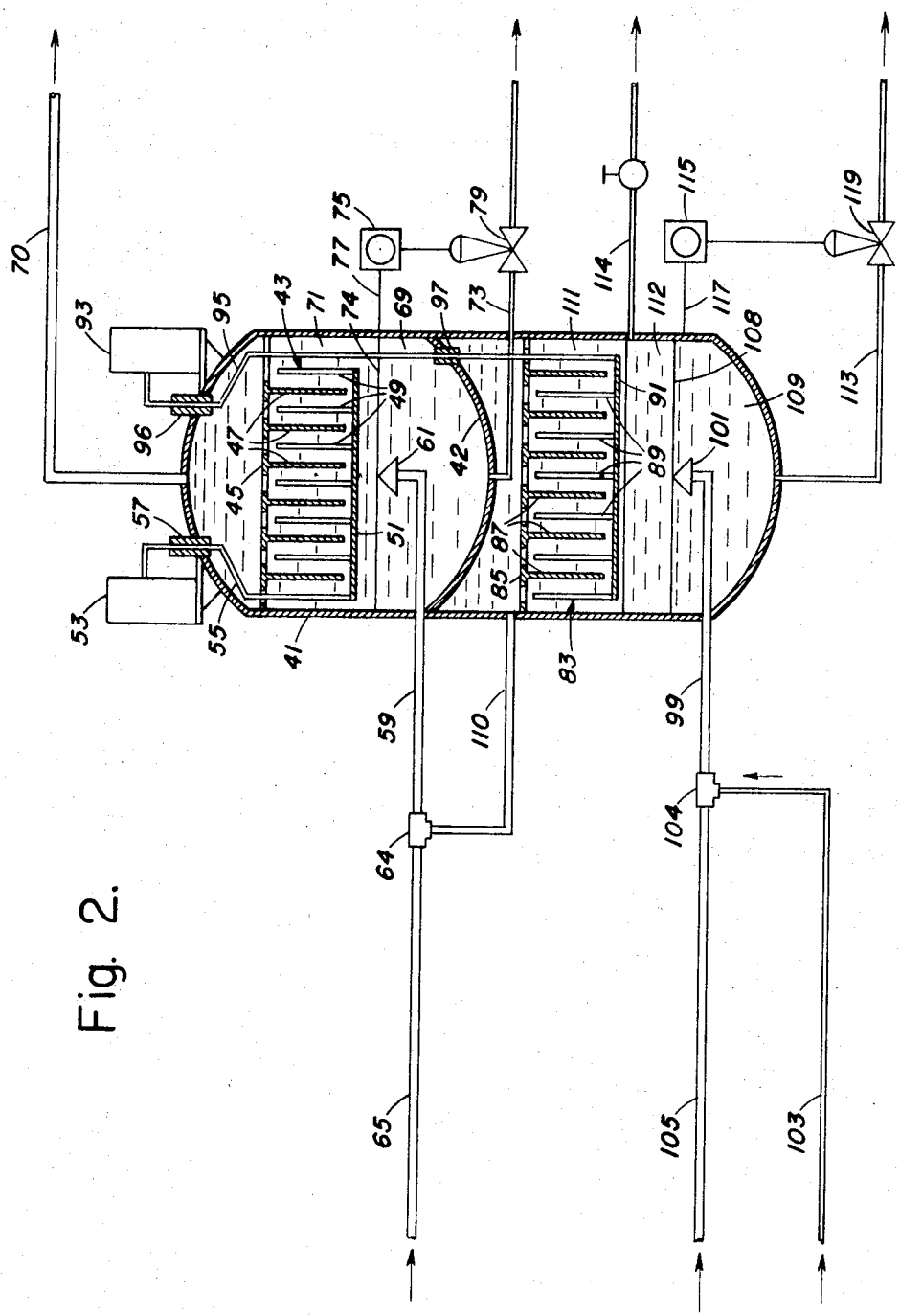

Such a coalescer will now be described in connection with the accompanying drawings wherein FIG. 1 is a diagrammatic view of an Electrofining Metercell Precipitator employed for single-stage operations and FIG. 2 is a diagrammatic view of a two-stage Electrofining Metercell Precipitator.

With reference more particularly to FIG. 1 of the drawings, it will be seen that the electrostatic coalescer comprises a tank or shell 1 of suitable material such as steel having an electrode assembly 3 mounted in the upper portion of the tank 1. Electrode assembly 3 comprises a grounded cellular electrode 5 which is electrically grounded to the tank 1 and which comprises an assembly of long tubes 7 of square cross-section into which concentric rod electrodes 9 are supported from beneath by an energized and insulated structure or plate 11. The plate 11 is supported by the sides of the tank shell 1 by insulated supports (not shown) and it connects electrically all of the rod electrodes 9 to a direct current power pack 13, mounted on the top of tank 1, by means of an electrical conductor 15 which passes through a bushing 17 of insulating material in the top of tank 1. The other side of the power pack is grounded and thus when the voltage is applied by the power pack an electrostatic field is set up between the cellular electrode 5 and the rod electrodes 9.

A suitable inlet 19 is provided near the bottom of tank 1 for the fluid to be treated which has affixed to the end thereof a suitable distributor 21 whereby the liquid to be treated is directed upwardly and between the rod electrodes and cellular electrode 5 for treatment.

In the operation of the Electrofining Metercell Precipitator in accordance with the instant invention, the polyether and solvent are previously mixed by suitable means, such as a mixing tank, and the mixture passed through a conduit 23 into a mixing device, such as an orifice mixer 24 wherein the polyether and solvent are mixed with water which enters the mixer through conduit 25. The mixture from mixer 24 enters tank 1 through an inlet conduit 19 and is directed upwardly toward the electrode assembly 3 by distributor 21. The water which now contains the impurities settles to the bottom of the tank as indicated by the layer 29 and the layer of mixture being treated as well as purified material which exits from the tank through line 30 is indicated by the numeral 31.

The water exits from the tank 1 by passage through an outlet conduit 33. The interface 34 between the water 29 and the material being treated 31 is maintained generally at about the distributor level by the use of a suitable liquid level controller 35 which has a sensing device (not shown) located in the side of the tank 1 electrically connected to the controller by an electric connection 37. The controller 35 controls a valve 39 in the outlet line 33 from the tank 1 to maintain the desired water level.

With reference now more particularly to FIG. 2 of the drawings, it will be seen that the two-stage precipitator comprises a tank or shell 41 of suitable material such as steel, as in the case of the single-stage precipitator. However, the two-stage precipitator includes a steel diaphragm or wall 42 which divides the tank 41 into two parts. Each of these parts forms a precipitator cell each of which contains the elements of the single-stage precipitator.

More specifically, the portion above divider 42 has an electrode assembly 43 comprising a grounded cellular electrode 45 which is electrically grounded to the tank 41 and which comprises an assembly of tubes 47 of square cross-section into which concentric rod electrodes 49 are supported from beneath by an energized and insulated structure or plate 51 which latter connects electrically all of the rod electrodes 49 to a direct current power pack 53 by means of an electrical connection 55 which passes through a bushing 57. A suitable inlet 59 is provided near the bottom of the upper portion of tank 41 which has affixed to the end thereof a suitable distributor 61.

Similarly, the lower section of tank 41 has in the upper portion thereof an electrode assembly 83 which comprises a cellular electrode 85 made up of an assembly of tubes 87 into which concentric rod electrodes 89 are supported by a plate 91 which connects electrically all of the rod electrodes 89 to a direct current power pack 93 by means of an electrical conductor 95 which passes through bushings 96 and 97. A suitable inlet 99 is provided near the bottom of tank 41 which has affixed to the end thereof a suitable distributor 101.

In the operation of the Electrofining Metercell Precipitator of FIG. 2 in accordance with the instant invention, the polyether and solvent are previously mixed by suitable means, such as a mixing tank, and the mixture passed through a conduit 103 into a mixing device, such as an orifice mixer 104, wherein the polyether and solvent are mixed with water which enters the mixer through a conduit 105. The mixture from mixer 104 enters tank 41 through the inlet conduit 99 and is directed upwardly toward the electrode assembly 83. The water which now contains some of the impurities settles to the bottom of the tank as indicated by the layer 109 and the layer of mixture being treated as well as purified material which exits from the tank through conduit 110 is indicated by the numeral 111. The water exits from the tank 41 by passage through an outlet conduit 113. An interphase layer of material 112 may form which is made up of dirt particles and organic materials with densities between that of water and the layer 111 which may be periodically withdrawn through a conduit 114.

The interface 108 between the water and the interphase layer 112 is maintained generally at about the distributor level by the use of a suitable liquid level controller 115 which has a sensing device (not shown) located in the side of the tank 41 electrically connected to the controller by an electric connection 117. The controller 115 controls a valve 119 in the outlet line 113 from the tank 41 to maintain the desired water level.

The purified material exiting through conduit 110 passes into a mixing device, such as an orifice mixer 64, wherein this material is mixed with water which enters the mixer through conduit 65. The mixture from mixer 64 enters the upper section of tank 41 through inlet conduit 59 and is directed upwardly toward the electrode assembly 43 by the distributor 61. The water which now contains the impurities settles to the bottom of the upper section of tank 41, as indicated by the layer 69, and the layer of mixture being treated as well as purified material which exits from the tank through line 70 is indicated by the layer 71.

The water exits from the upper portion of tank 41 by passage through an outlet conduit 73. The interface 74 between the water 69 and the material being treated 71 is maintained generally at about the distributor level by use of a suitable liquid level controller 75 which has a sensing device (not shown) located in the side of the upper portion of tank 41 electrically connected to the controller by an electric connection 77. The controller 75 controls a valve 79 in the outlet conduit 73 from the tank to maintain the desired water level. The purified material exiting from the top of tank 41 through conduit 70 is then stripped of hexane to give the pure polyether.

The following examples are provided to further illustrate the invention.

EXAMPLES 1 AND 2

In these examples a glycerol-propylene oxide-ethylene oxide adduct having a molecular weight of about 3,000 and containing about 9% by weight ethylene oxide is mixed with hexane in a 2-gallon steam jacketed kettle in proportions to provide a polyether-hexane mixture containing 40% hexane by volume. The polyol-hexane mixture and water are each metered into an orifice mixer at a rate of 100 milliliters per minute of the polyol-hexane mixture and 40 milliliters per minute of water. In Example 1 the mixture is fed at a temperature of 180° F. into a laboratory model Electrofining Metercell Precipitator of the type shown in FIG. 1 of the drawings and described above. The mixture in Example 2 is fed at a temperature of 150° F. into a laboratory model Electrofining Metercell two-stage Precipitator of the type shown in FIG. 2 of the drawings. The above temperatures are maintained by a line heater. The voltage employed in both examples is 4 volts. The current in the single-stage precipitator of Example 1 is 1.4 milliamps; the current employed in the first stage of the two-stage precipitator of Example 2 is 1.1 milliamps and the current in the second stage is 0.5 milliamp.

In both examples the polyol-hexane solution obtained from the precipitator is stripped of hexane. The single-stage process of Example 1 produces a polyol having a potassium-sodium ion concentration of about 7 parts per million while the two-stage process of Example 2 produces a polyol having a potassium-sodium ion concentration of about 1 part per million as determined by the following flame test.

This method is based upon a flame photometric analysis of the ash which is derived from the sample. The procedure includes (a) ashing the sample, and (b) a flame photometric analysis of a water solution of this ash. The Beckman DU Flame Photometer was calibrated with samples of known sodium and potassium analyses.

EXAMPLES 3–18

The compositions of Table I below are treated according to the procedure described for Example 1 with the exception that different polyethers and/or different solvents are employed and the proportions of polyether, solvent and water are varied.

As in Examples 1 and 2, the potassium-sodium ion concentration in the final product is very low. The polyethers designated by the letters A, B, etc. in Table I below are as follows:

Polyether A is a polyoxypropylene glycol having a molecular weight of about 2000.

Polyether B is a polyoxypropylene adduct of trimethylolpropane having an average molecular weight of about 4500.

Polyether C is a polyoxyethylene adduct of a polyoxypropylene base having a molecular weight of about 1750 wherein the oxyethylene content is about 10 weight percent of the molecule.

Polyether D is hydroxypropylated bisphenol A having an average molecular weight of about 400.

Polyether E is a polyoxypropylene adduct of trimethylolpropane having a molecular weight of about 6000.

Polyether F is a glycerol-butylene oxide adduct having a molecular weight of 2000.

Polyether G is a polyoxypropylene glycol having a molecular weight of about 3000.

TABLE I

| Ex. | Polyether | Solvent | Percent solvent in polyether by volume | Rate of flow, ml./min. Polyol-solvent mix | Water |
|---|---|---|---|---|---|
| 3 | A | Hexane | 40 | 100 | 40 |
| 4 | B | do | 40 | 100 | 40 |
| 5 | C | do | 40 | 100 | 40 |
| 6 | D | do | 40 | 100 | 40 |
| 7 | E | do | 40 | 100 | 40 |
| 8 | F | do | 40 | 100 | 40 |
| 9 | G | do | 40 | 100 | 40 |
| 10 | A | do | 45 | 100 | 30 |
| 11 | A | do | 40 | 100 | 20 |
| 12 | A | do | 30 | 100 | 60 |
| 13 | A | do | 25 | 100 | 70 |
| 14 | B | Cyclohexane | 40 | 100 | 40 |
| 15 | A | do | 40 | 100 | 40 |
| 16 | C | Methylchloroform | 40 | 100 | 40 |
| 17 | D | 1,1,2-trichloro-1,2,2-trifluoroethane. | 40 | 100 | 40 |
| 18 | A | Perchloroethylene | 40 | 100 | 40 |

What is claimed is:

1. A method for purifying water-insoluble polyoxyalkylene ether polyols having a molecular weight of about 300–10,000 containing water soluble residual catalysts which comprises providing a mixture of water, said polyol and a solvent which is substantially immiscible in water, which has a density substantially different from water in which said polyol is soluble and which is relatively inert with respect to the polyol and water, whereby a polyol-solvent solution is formed which is substantially immiscible in water, the amount of said solvent being sufficient to adjust the density differential between the polyol-solvent solution and water to at least about 0.03 gram per milliliter, effecting separation of said polyol-solvent solution from said water by electrostatic coalescence, separately recovering from said separation a stream of water containing dissolved therein said water-soluble impurities and a stream of polyol-solvent solution and separating said solvent from said polyol-solvent solution.

2. The process of claim 1 wherein said mixture of water, polyol and solvent is at a temperature of about 60° C. to 120° C.

3. The process of claim 2 wherein the amount of water in said water-polyol-solvent mixture is in a proportion of from about 0.1 to 4 parts by volume.

4. The process of claim 3 wherein said solvent is hexane.

5. The process of claim 3 wherein said solvent is separated by stripping.

References Cited

UNITED STATES PATENTS

| | | | |
|---|---|---|---|
| 2,855,360 | 10/1958 | Waterman | 204—304 |
| 3,313,846 | 4/1967 | Slovinsky | 260—2 |
| 3,299,151 | 1/1967 | Wismer et al. | |

TA-HSUNG TUNG, Primary Examiner

N. A. KAPLAN, Assistant Examiner

U.S. Cl. X.R.

204—302; 260—616